United States Patent
Ban et al.

(10) Patent No.: US 11,793,154 B1
(45) Date of Patent: Oct. 24, 2023

(54) AUTOMATIC TRASH BAG SEALING DEVICE IN AN AUTOMATIC CAT LITTER BOX AND AUTOMATIC CAT LITTER BOX

(71) Applicant: Furbulous Network Technology (Shanghai) Co., Ltd., Shanghai (CN)

(72) Inventors: Jian Ban, Shanghai (CN); Zihao Wu, Shanghai (CN); Qiaoxin Qian, Shanghai (CN); Yonghui Wang, Shanghai (CN); Yunyun Mao, Shanghai (CN)

(73) Assignee: Furbulous Network Technology (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 18/129,180

(22) Filed: Mar. 31, 2023

(30) Foreign Application Priority Data

Aug. 9, 2022 (CN) .......................... 202222088209.0

(51) Int. Cl.
*A01K 1/01* (2006.01)
*B65F 1/14* (2006.01)
*B65B 51/14* (2006.01)

(52) U.S. Cl.
CPC ............ *A01K 1/011* (2013.01); *B65B 51/146* (2013.01); *B65F 1/14* (2013.01); *B65F 2210/167* (2013.01)

(58) Field of Classification Search
CPC ........ A01K 1/011; A01K 1/0114; A01K 1/01; B65F 1/14; B65F 2210/167; B65B 51/146
See application file for complete search history.

(56) References Cited

U.S. PATENT DOCUMENTS

| | | | | |
|---|---|---|---|---|
| 5,181,480 A * | 1/1993 | Dabolt | ................... | A01K 1/011 119/161 |
| 5,183,009 A * | 2/1993 | Vito | ....................... | A01K 1/011 248/99 |
| 7,628,118 B1 * | 12/2009 | Nottingham | ......... | A01K 1/0114 119/166 |
| 8,408,160 B1 * | 4/2013 | Pozin | ..................... | A01K 1/011 53/567 |
| 8,985,653 B1 * | 3/2015 | Kest | ...................... | A01K 1/0114 294/1.3 |
| 2011/0017142 A1 * | 1/2011 | Tsengas | ............... | A01K 1/0114 119/166 |
| 2021/0161096 A1 * | 6/2021 | Fan | ........................ | A01K 1/011 |
| 2022/0125006 A1 * | 4/2022 | Smith | .................. | A01K 1/0114 |

FOREIGN PATENT DOCUMENTS

| CN | 111034623 A | * | 4/2020 | ............. A01K 1/011 |
|---|---|---|---|---|
| CN | 113525965 A | * | 10/2021 | |

* cited by examiner

*Primary Examiner* — Yvonne R Abbott-Lewis
(74) *Attorney, Agent, or Firm* — Bayramoglu Law Offices LLC (57) ABSTRACT

The present disclosure discloses an automatic trash bag sealing device for an automatic cat litter box and an automatic cat litter box. In the automatic trash bag sealing device, a drive motor drives a first rod and/or a second rod to rotate, thereby driving a pushing member to move towards a sealing member, and the trash bag is sealed when the sealing member is interfaced with the pushing member. The sealing device has fewer parts and is simple to assemble, effectively reducing the difficulty of process assembly and the overall cost of the automatic cat litter box.

10 Claims, 6 Drawing Sheets

AUTOMATIC TRASH BAG SEALING DEVICE IN AN AUTOMATIC CAT LITTER BOX AND AUTOMATIC CAT LITTER BOX

TECHNICAL FIELD

The present disclosure relates to the technical field of pet equipment, and particularly to an automatic trash bag sealing device for an automatic cat litter box and an automatic cat litter box.

BACKGROUND

At present, pet toilets on the market gradually tend to be intelligent, such as a full-automatic cat litter box which is very popular on the market, to guide cats to excrete bodily waste in a fixed area to facilitate the cleaning of cat litter.

In the existing full-automatic cat litter box, a trash bag used for collecting cat excrement is mostly sealed by a bidirectional moving packaging rod to clamp the trash bag, which not only cannot achieve complete sealing to control odor emission but also has two driving and transmission mechanisms, resulting in many parts and complicated structures.

Therefore, there is a need to improve the existing technology to overcome the defects in the existing technology.

SUMMARY

Given the above shortcomings in the existing technology, the present disclosure provides an automatic trash bag sealing device for an automatic cat litter box, which realizes the function of packaging and sealing the trash bag with fewer parts.

To solve the above technical problems, a technical scheme adopted in the present disclosure is as follows:

An automatic trash bag sealing device for an automatic cat litter box includes:
  a cat litter storage box in which a trash bag can be placed;
  a drive motor;
  a first rod disposed at an open end of the cat litter storage box and connected with an output end of the drive motor;
  a second rod disposed at the open end of the cat litter storage box;
  a pushing member having a first hole at one end and a second hole at an opposite end, the first hole sleeving the second rod, and the second hole sleeving the first rod; and
  a sealing member disposed at the open end of the cat litter storage box and capable of interfacing with the pushing member to seal the trash bag.

The drive motor is configured for driving the first rod and/or the second rod to rotate along its own axis, and the rotation of the first rod and/or the second rod drives the pushing member to move towards the sealing member to seal the trash bag.

In an embodiment, the sealing member is provided with a heating wire on a surface facing the pushing member. An interfacing face is disposed between two ends of the pushing member. When the pushing member is interfaced with the sealing member, the heating wire heats up to fuse and seal a portion of the trash bag between the heating wire and the interfacing face.

In an embodiment, the automatic trash bag sealing device further includes a first sensor configured for detecting whether the pushing member is located at an initial position.

In an embodiment, the automatic trash bag sealing device further includes a second sensor configured for detecting whether the pushing member is interfaced with the sealing member.

In an embodiment, the second sensor is a microswitch and is disposed on one side of the sealing member.

In an embodiment, the first rod is a screw having the first threads on the surface. The second hole has second threads on the surface, or a threaded sleeve with the second threads is embedded in the second hole. The second threads are matched with the first threads.

In an embodiment, the second rod has a substantially smooth surface.

In an embodiment, the second rod is connected to the output end of the drive motor. The second rod is a screw having the first threads on the surface. The first hole has second threads on the surface, or a threaded sleeve with the second threads is embedded in the first hole. The second threads are matched with the first threads.

In an embodiment, two ends of the pushing member are respectively provided with first guide faces and second guide faces, each of the first guide faces and the second guide faces having a bending section facing the sealing member.

The utility model further provides an automatic cat litter box, which includes the automatic trash bag sealing device described in any of the above embodiments.

Compared with the existing technology, the utility model has the following beneficial effects:

The present disclosure provides an automatic trash bag sealing device for an automatic cat litter box and an automatic cat litter box; in the sealing device, a drive motor drives a first rod and/or a second rod to rotate, thereby driving a pushing member to move towards a sealing member, and the trash bag is sealed when the sealing member is interfaced with the pushing member; the sealing device has fewer parts and is simple in structural assembly, which can effectively reduce the difficulty of process assembly and the overall cost of the automatic cat litter box.

BRIEF DESCRIPTION OF THE DRAWINGS

To illustrate the technical scheme in the embodiments of the utility model clearly, the drawings used in the description of the embodiments will be briefly introduced below. Apparently, the drawings described below are only some embodiments of the utility model. For those having ordinary skills in the art, other drawings can be obtained according to these drawings without creative work.

DETAILED DESCRIPTION

The technical scheme of the utility model will be described clearly and completely in conjunction with the drawings. Apparently, the described embodiments are only a part, but not all, of the embodiments of the utility model. Hereinafter, the utility model will be described in detail with reference to the drawings and in conjunction with the embodiments. It is to be noted that the embodiments of the utility model and the features in the embodiments can be combined with each other if not in conflict.

It is to be noted that the terms "first," "second," and the like in the description and claims of the utility model and the above drawings are used to distinguish similar objects and are not necessarily used to describe a specific sequence or sequential order.

In the utility model, directional terms such as "upper," "lower," "top," and "bottom" are usually used with respect to the directions shown in the drawings, or with respect to the components themselves in vertical, perpendicular or gravitational directions, unless otherwise stated. Likewise, for ease of understanding and description, "inner" and "outer" are interpreted with respect to the contour of each component, and the described directional terms are not intended to limit the utility model.

Figure 1:
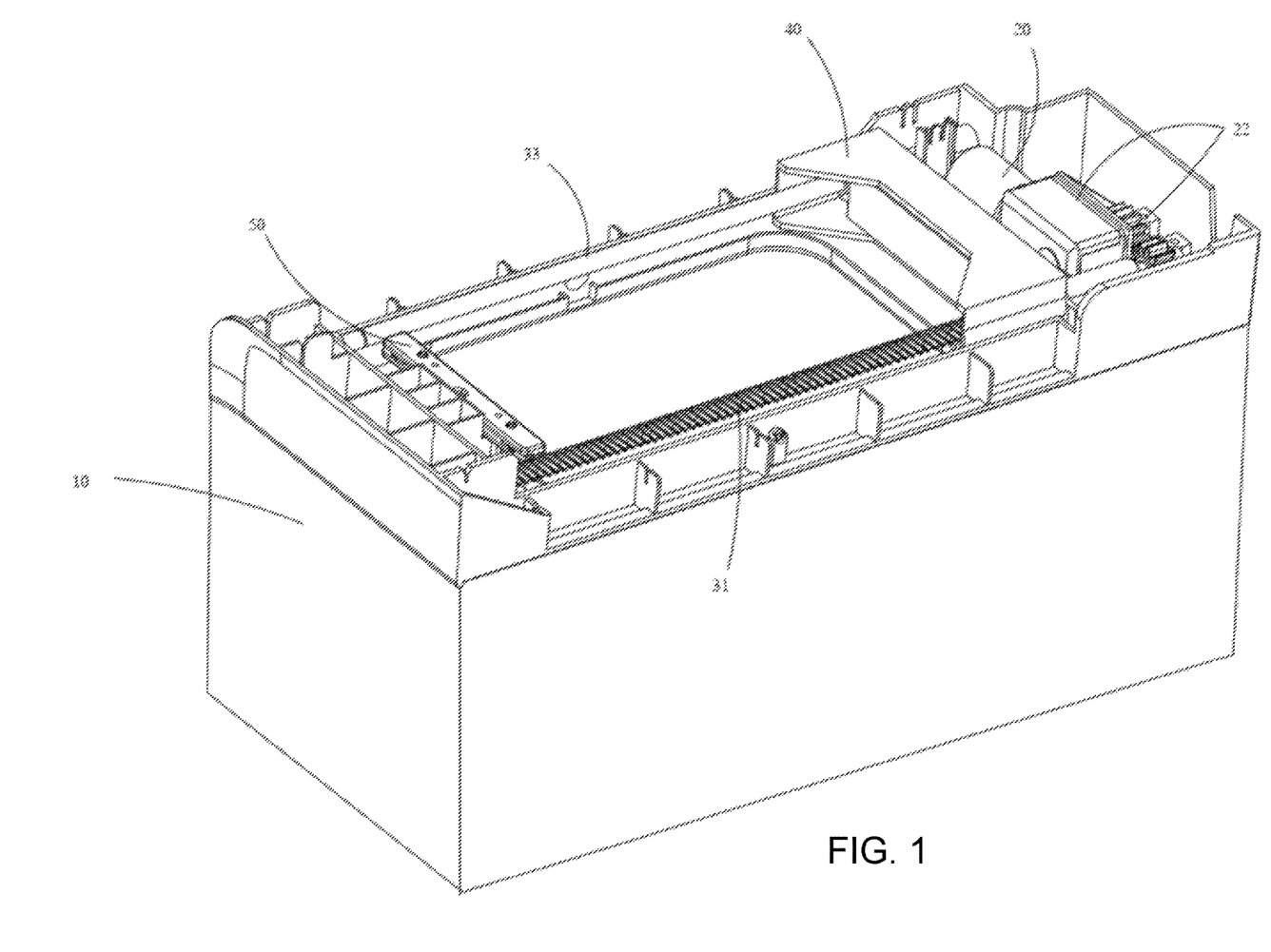
FIG. 1 is a front view of an automatic trash bag sealing device for an automatic cat litter box as proposed by the present disclosure.
Figure 2:
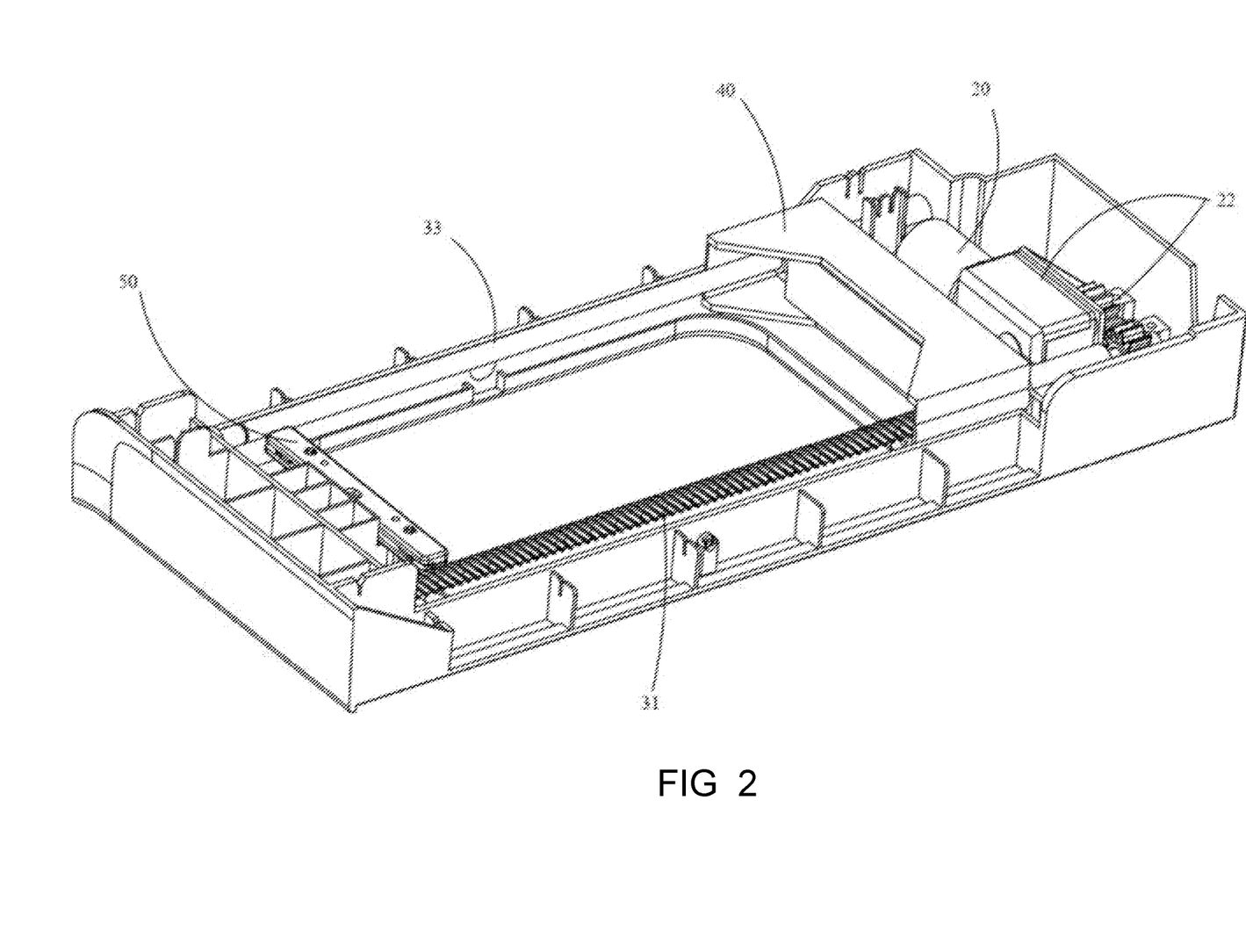
FIG. 2 is a schematic perspective structural diagram of FIG. 1 with an accommodating cavity of a cat litter storage box hidden.

Referring to FIGS. 1 to 2, an embodiment of the present disclosure provides an automatic trash bag sealing device 100 for an automatic cat litter box, which may be referred to as an automatic sealing device or an automatic trash bag sealing device, and is applied to an automatic cat litter box or a cat litter basin. In this embodiment, the automatic sealing device 100 includes a cat litter storage box 10, a drive motor 20, a first rod 31, a second rod 33, a pushing member 40 and a sealing member 50.

In this embodiment, the cat litter storage box 10 has a bottom and four surrounding walls extending upwards from the bottom to define a rectangular-like accommodating cavity and a rectangular-like open end. A trash bag can be placed in the accommodating cavity to collect cat excrement. It should be clarified here that for the sake of convenience and clarity of illustration, the embodiments of the utility model describe the position settings and relative positional relationships of the first rod 31, the second rod 33, the pushing member 40, and the sealing member 50 on the basis that the cat litter storage box 10 is approximately rectangular. However, the position settings and relative positional relationships described here do not constitute limitations to the utility model. The automatic trash bag sealing device 100 of the embodiments of the utility model is still applicable when the shape of the cat litter storage box 10 varies.

The first rod 31 is disposed at the open end of the cat litter storage box 10. The first rod 31 is connected to an output end of the drive motor 20. The first rod 31 can be driven by the drive motor 20 to rotate along its own axis. In this embodiment, the first rod 31 and the drive motor 20 may also be provided with one or more stages of transmission gears 22 to adjust the rotation speed of the first rod 31 to be different from that of the drive motor 20.

The second rod, 33 is disposed at the open end of the cat litter storage box 10. In this embodiment, the second rod 33 has a substantially smooth surface and plays a guiding role. The second rod 33 and the first rod 31 are located on two long sides of the open end, respectively. That is, the second rod 33 and the first rod 31 are spaced apart in parallel, such that the pushing member 40 moves more smoothly.

Figure 5:
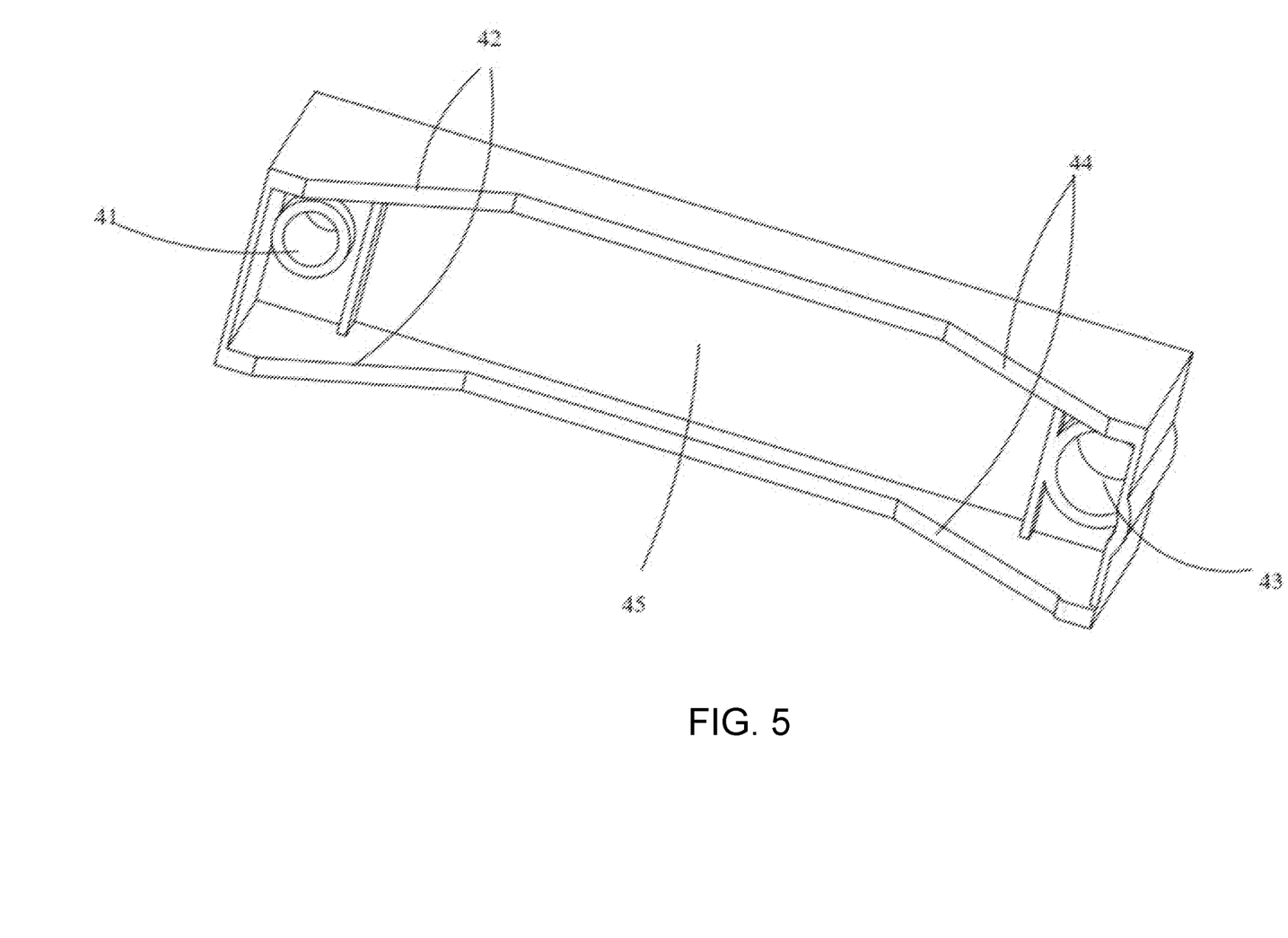
FIG. 5 is a schematic perspective diagram of the pushing member in FIG. 1.

Referring to FIG. 5, the pushing member 40 has a first hole 41 at one end and a second hole 43 at the opposite end. The first hole 41 sleeves the second rod 33, and the second hole 43 sleeves the first rod 31. The pushing member 40 is reciprocally movable along a rod body direction defined by the second rod 33 and the first rod 31. In an initial state, the pushing member 40 is located on one short side of the open end of the cat litter storage box 10.

In this embodiment, the first rod 31 is a screw having the first threads on the surface. A threaded sleeve (not shown in FIG. 5) is embedded in the second hole 43 in an expanding manner, and the threaded sleeve has second threads on the surface. The second threads are matched with the first threads. When the screw rotates, the pushing member 40 moves along a screw body direction of the screw based on a matching transmission relationship between the first threads and the second threads. Optionally, the first rod 31 is a screw having first threads on the surface, and the second hole 43 is directly provided with second threads on the surface that are matched with the first threads. Although the implementation of the threaded sleeve adds a transmission matching part, the process difficulty in forming the second threads in the hole is reduced, and the cost is effectively lowered.

An interfacing face 45 is disposed between the first hole 41 and the second hole 43 of the pushing member 40 for interfacing with the sealing member 50. Preferably, the interfacing face 45 is planar, and the surface of the sealing member 50 facing the pushing member 40 is also planar. Two ends of the pushing member 40 are respectively provided with first guide faces 42 and second guide faces 44, each of the first guide faces 42, and the second guide faces 44 having a bending section facing the sealing member 50. When the pushing member 40 drives the trash bag to close up toward the sealing member 50, the first guide faces 42, and the second guide faces 44 help the pushing member 40 and the sealing member 50 to clamp the opening of the trash bag together.

The sealing member 50 is disposed at the open end of the cat litter storage box, specifically, on the other short side of the open end opposite to the pushing member 40. The sealing member 50 can be interfaced with the pushing member 40 to seal the trash bag. The drive motor 20 can drive the first rod 31 to rotate along its own axis, and the rotation of the first rod 31 drives the pushing member 40 to move along the second rod 33 (or/and the first rod 31) towards the sealing member 50. When the pushing member 40 is interfaced with the sealing member 50, the trash bag can be sealed.

In an embodiment, the sealing member 50 is provided with a heating wire (not shown) on a surface facing the pushing member 40. When the pushing member 40 is interfaced with the sealing member 50, the heating wire heats up to fuse and seal a portion of the trash bag between the heating wire and the interfacing face 45, to realize the sealing and packaging of the trash bag. Meanwhile, the bottom of the cut-off trash bag is sealed and becomes the bottom of a next trash bag. Preferably, the interfacing face 45 is made of a metal for faster fusing and sealing.

In the automatic trash bag sealing device 100 provided by the embodiment of the utility model, the first rod 31 is driven to rotate by the drive motor 20, thereby driving the pushing member 40 to move towards the sealing member 50, and the trash bag is sealed when the sealing member 50 is interfaced with the pushing member 40. The sealing device 100 has fewer parts and is simple in structural assembly, which can effectively reduce the difficulty of process assembly and the overall cost of the automatic cat litter box. Further, with fewer parts, the transmission portion of the sealing device 100 occupies less space, reducing the overall size of the cat litter box.

Figure 3:
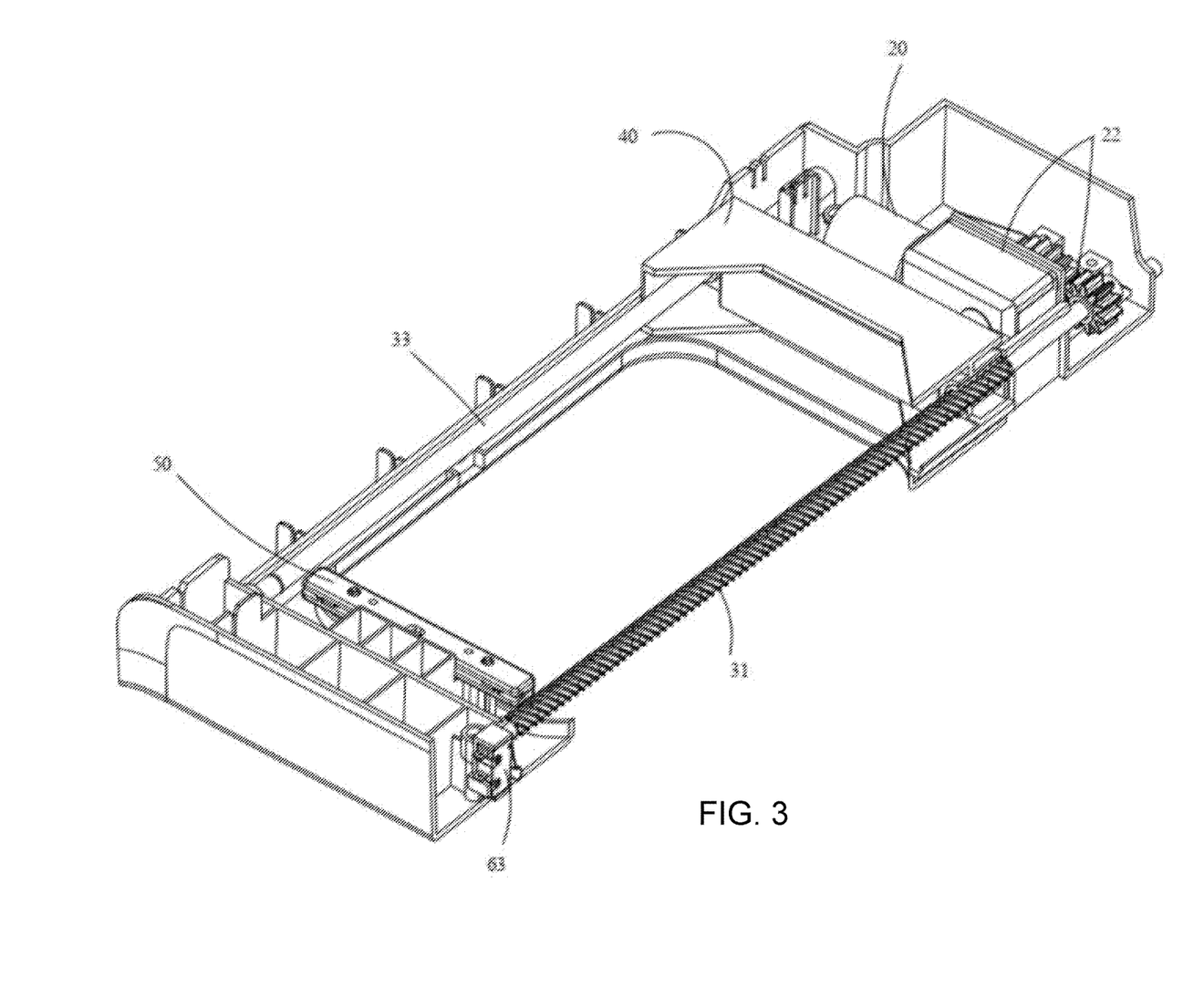
FIG. 3 is a schematic perspective structural diagram of FIG. 2 with a side plate at an open end of a first rod hidden.

Referring to FIG. 3, optionally, the automatic trash bag sealing device 100 further includes a first sensor 61. The first sensor 61 is configured to detect whether the pushing member 40 is at an initial position. In this embodiment, the first sensor 61 is a microswitch disposed near the tail end of the second rod 33. When the pushing member 40 is in the initial position, a rear side of the pushing member 40 will press the microswitch. After the pushing member 40 leaves the initial position and moves towards the sealing member 50, pushing member 40 no longer presses the microswitch. Through a signal change of the first sensor 61, a cat litter box controller can determine whether the automatic trash bag sealing device 100 has started the packaging and sealing operation.

Figure 4:
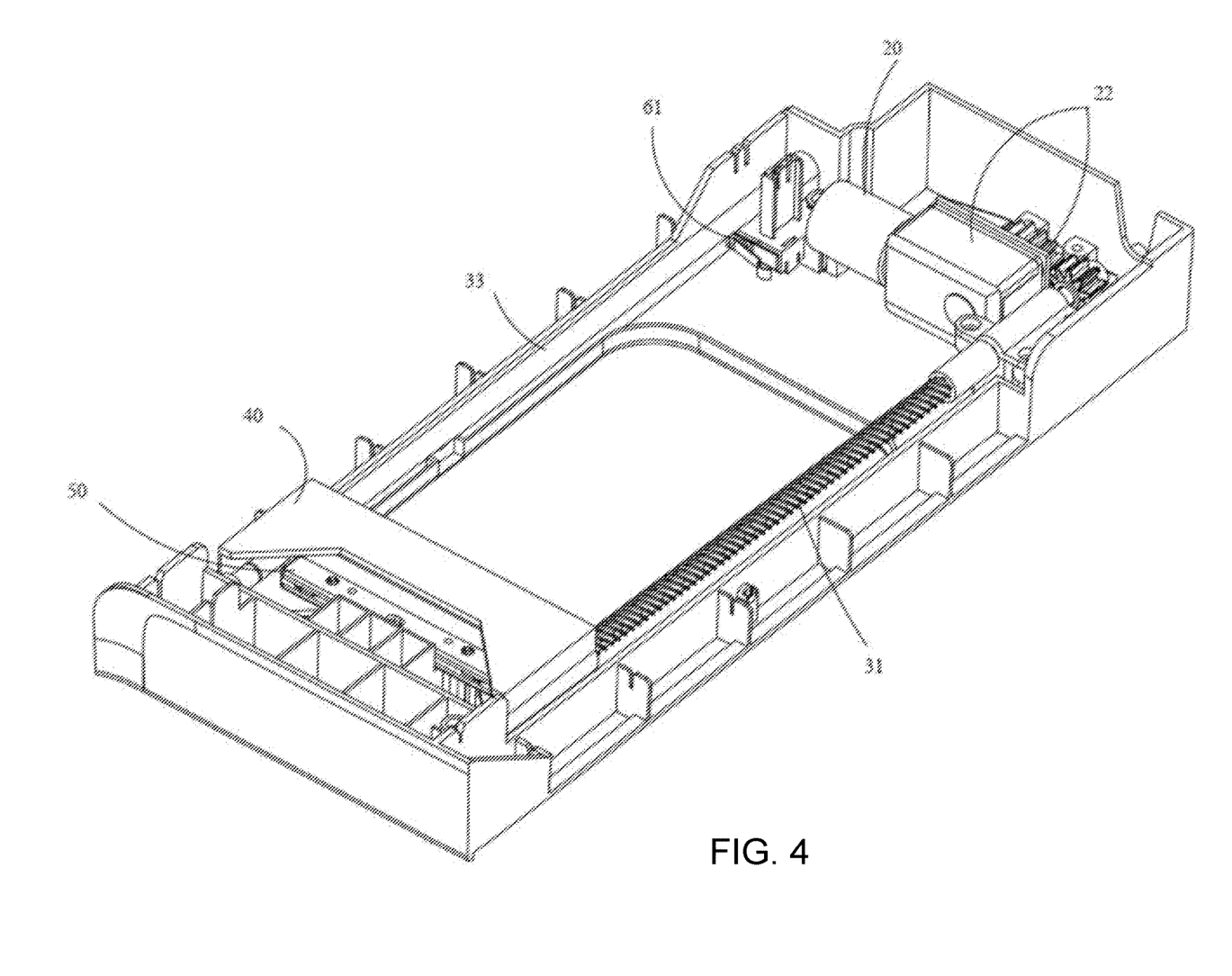
FIG. 4 is a schematic perspective structural diagram showing interfacing between a pushing member and a sealing member in FIG. 2.

Referring to FIG. 4, optionally, the automatic trash bag sealing device 100 further includes a second sensor 63. The second sensor 63 is configured to detect whether pushing member 40 is interfaced with sealing member 50. In this embodiment, the second sensor 63 is a microswitch disposed on one side of the sealing member 50. When the pushing member 40 is interfaced with the sealing member 50, the edge of the pushing member 40 will press the microswitch. When the pushing member 40 is no longer interfaced with the sealing member 50, the edge of the pushing member 40 will not press the microswitch. Through a signal change of the second sensor 63, the cat litter box controller can determine whether the pushing member 40 has reached the packaging position, so as to determine whether to energize the heating wire for heating up.

In the automatic trash bag sealing device 100 provided by the embodiment of the utility model, the process of packaging and sealing a trash bag is described as follows:

As shown in FIG. 1, in the initial state, the pushing member 40 is located at the initial position (i.e., on the side away from the open end of the sealing member 50). The trash bag is in an open state, that is, a peripheral wall of the trash bag is located at four inner side walls of the cat litter storage box 10. Preferably, the automatic trash bag sealing device 100 further includes an air extraction unit, which can extract air from the cat litter storage box 10 to produce a negative pressure in the storage box 10. The trash bag is attached to the four inner side walls of the cat litter storage box 10 under the action of a pressure difference, such that the trash bag is wholly opened to fill the accommodating cavity of the cat litter storage box 10, facilitating the collection of cat litter.

At the beginning of trash bag packaging, the drive motor 20 is started to drive the first rod 31 to rotate around its own axis, which drives the pushing member 40 to move along a rod body direction of the first rod 31 until the pushing member 40 is interfaced with the sealing member 50 (as shown in FIG. 4). At this time, the heating wire on the sealing member 50 is energized to heat up continuously for a preset time, to fuse and seal a portion of the trash bag between the heating wire and the interfacing face 45 to realize the sealing and packaging of the trash bag. Meanwhile, the bottom of the cut-off trash bag is sealed and becomes the bottom of the next trash bag.

Figure 6:
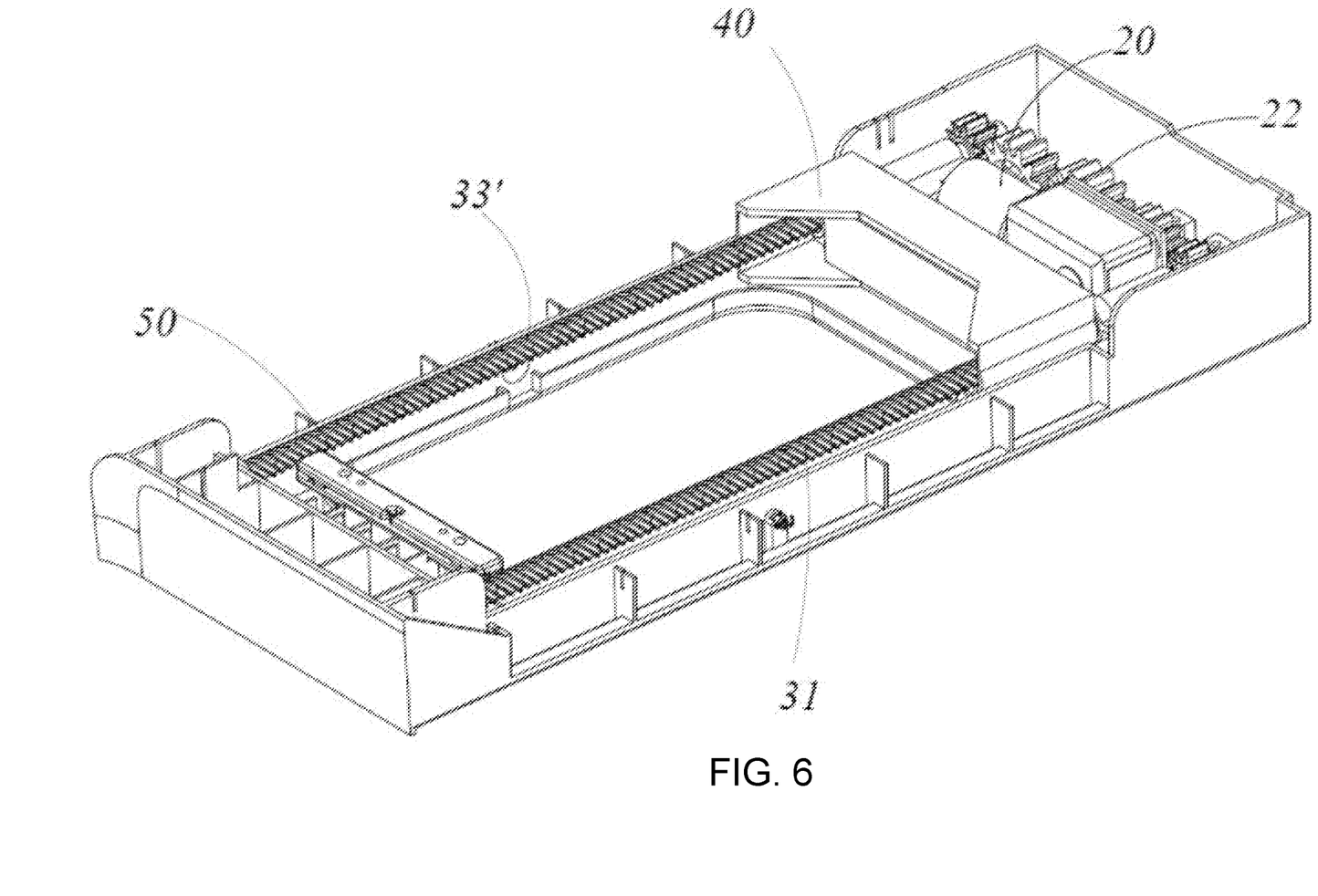
FIG. 6 is a schematic perspective structural diagram of another embodiment of the present disclosure.

As shown in FIG. 6, the utility model provides another embodiment that differs from the embodiments described in FIGS. 1 to 5 in that the second rod is different. In this embodiment, a second rod 33' is connected with the output end of the drive motor 20, and can rotate along its own axis under the drive of the drive motor 20. In this embodiment, the second rod 33' and the first rod 31 are both transmission rods. The second rod 33' and the drive motor 20 may also be provided with one or more stages of transmission gears 22 to adjust the rotation speed of the second rod 33' to be different from that of the drive motor 20. Preferably, the speed of the second rod 33' is kept consistent with that of the first rod 31. The two transmission rods simultaneously drive the pushing member 40 to move, allowing for a smoother moving process and effectively driving the trash bag to shift. It can be understood that in other embodiments, the drive motor 20 does not drive the first rod, and only the second rod 33' is a transmission rod.

In this embodiment, the second rod 33' is a screw having first threads on the surface. A threaded sleeve (not shown in FIG. 6) is embedded in the first hole 41 in an expanding manner, and has second threads on the surface. The second threads are matched with the first threads. When the screw rotates, the pushing member 40 moves along a screw body direction of the screw based on a matching transmission relationship between the first threads and the second threads. Optionally, the second rod 33' is a screw having first threads on the surface. The first hole, 41, is directly provided with second threads on the surface that match the first threads. The utility model further provides an automatic cat litter box, which adopts the automatic sealing device described in any of the above embodiments.

Obviously, the embodiments described above are only a part, but not all, of the embodiments of the utility model. Based on the utility model's embodiments, those with ordinary skills in the art can make other variations or changes in different forms without creative efforts, which should all fall within the scope of protection of the utility model.

What is claimed is:

1. An automatic trash bag sealing device for an automatic cat litter box, comprising:
    a cat litter storage box in which a trash bag can be placed;
    a drive motor;
    a first rod disposed at an open end of the cat litter storage box and connected with an output end of the drive motor;
    a second rod disposed at the open end of the cat litter storage box;
    a pushing member having a first hole at one end and a second hole at an opposite end, the first hole sleeving the second rod, and the second hole sleeving the first rod; and
    a sealing member disposed at the open end of the cat litter storage box and capable of interfacing with the pushing member to seal the trash bag;
    wherein the drive motor is configured for driving the first rod and/or the second rod to rotate along its own axis, and the rotation of the first rod and/or the second rod drives the pushing member to move towards the sealing member to seal the trash bag.

2. The automatic trash bag sealing device for the automatic cat litter box of claim 1, wherein the sealing member is provided with a heating wire on a surface facing the pushing member; an interfacing face is disposed between two ends of the pushing member; and when the pushing member is interfaced with the sealing member, the heating wire heats up to fuse and seal a portion of the trash bag between the heating wire and the interfacing face.

3. The automatic trash bag sealing device for the automatic cat litter box of claim 1, further comprising a first sensor configured for detecting whether the pushing member is located at an initial position.

4. The automatic trash bag sealing device for the automatic cat litter box of claim 1, further comprising a second sensor configured for detecting whether the pushing member is interfaced with the sealing member.

5. The automatic trash bag sealing device for the automatic cat litter box of claim 4, wherein the second sensor is a microswitch and is disposed on one side of the sealing member.

6. The automatic trash bag sealing device for the automatic cat litter box of claim 1, wherein the first rod is a screw having first threads on a surface; the second hole has second threads on a surface, or a threaded sleeve with the second threads is embedded in the second hole; and the second threads are matched with the first threads.

7. The automatic trash bag sealing device for the automatic cat litter box of claim 1, wherein the second rod has a substantially smooth surface.

8. The automatic trash bag sealing device for the automatic cat litter box of claim 1, wherein the second rod is connected with the output end of the drive motor and is a screw having first threads on the surface; the first hole has second threads on the surface, or a threaded sleeve with the second threads is embedded in the first hole; and the second threads are matched with the first threads.

9. The automatic trash bag sealing device for the automatic cat litter box of claim 1, wherein two ends of the pushing member are respectively provided with first guide faces and second guide faces, each of the first guide faces and the second guide face having a bending section facing the sealing member.

10. An automatic cat litter box, comprising the automatic trash bag sealing device of claim 1.

\* \* \* \* \*